Jan. 4, 1966  J. S. JARVIS  3,226,918
COOLING MEANS FOR COMBINE HARVESTERS
Filed Dec. 16, 1963  3 Sheets-Sheet 1

INVENTOR
John Stevens Jarvis
BY
ATTORNEY

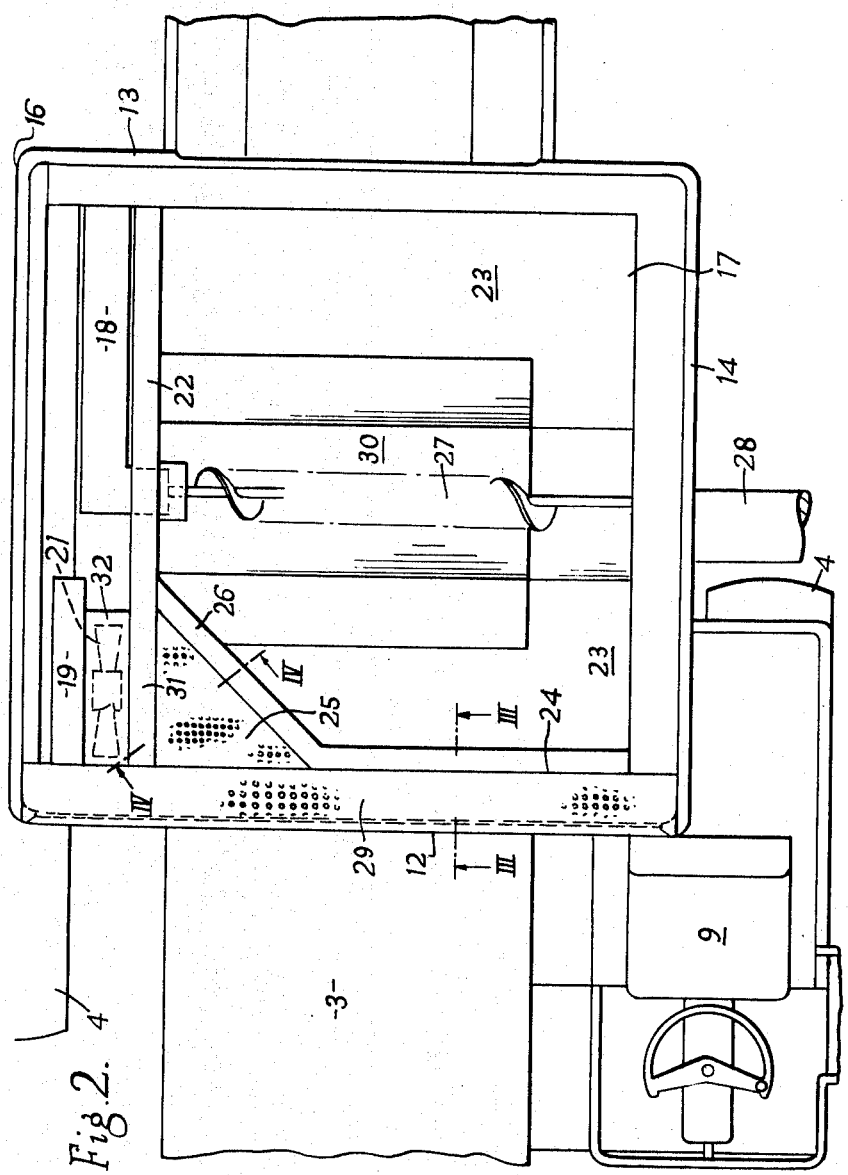

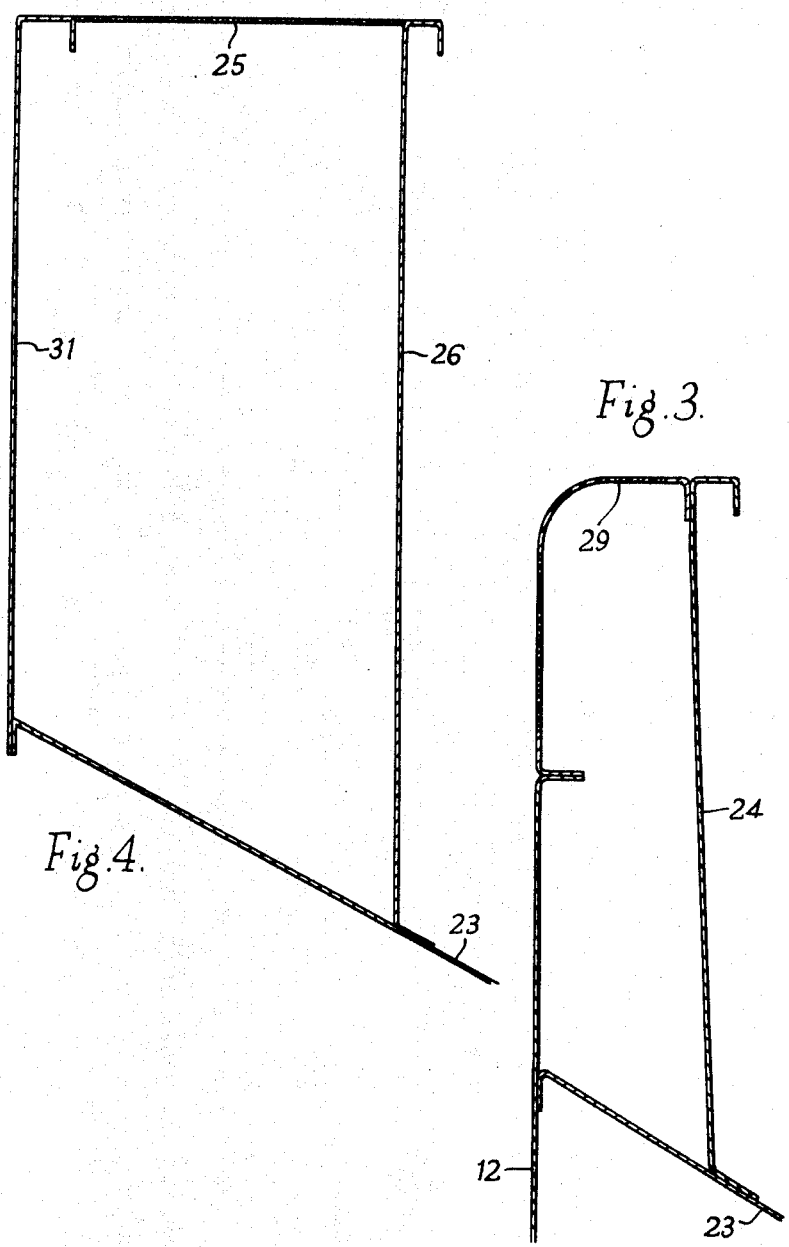

United States Patent Office 3,226,918
Patented Jan. 4, 1966

3,226,918
COOLING MEANS FOR COMBINE HARVESTERS
John Stevens Jarvis, Ipswich, England, assignor to Ransomes Sims & Jefferies Limited, Ipswich, Suffolk, England
Filed Dec. 16, 1963, Ser. No. 330,983
8 Claims. (Cl. 56—20)

This invention relates to combine harvesters.

The present invention consists in a combine harvester having a cutting mechanism, a threshing mechanism for threshing crop cut by the cutting mechanism, and a grain storage tank for storing threshed grain, wherein the grain tank is disposed within an enclosing means at an upper part of the harvester, there being defined between the grain tank and the enclosing means a passage having an inlet and an outlet in which passage is disposed an engine cooling system having a radiator and a fan, the fan serving, during operation, to cause flow of air substantially free from straw particles through the passage from inlet to outlet thereof and across the radiator.

Preferably the enclosing means is disposed rearwardly of an operator's platform of the harvester and the inlet of the passage is provided in a front wall of the enclosing means, whereby operation of the fan causes air to be drawn past the operator's platform and through the passage inlet.

The invention will now be described by way of example, with reference to the accompanying drawings, in which:

FIGURE 2 is a fragmentary plan view of the harvester shown in FIGURE 1;

FIGURE 3 is a section taken along the line III—III of FIGURE 2; and

FIGURE 4 is a section taken along the line IV—IV of FIGURE 2.

Figure 1:
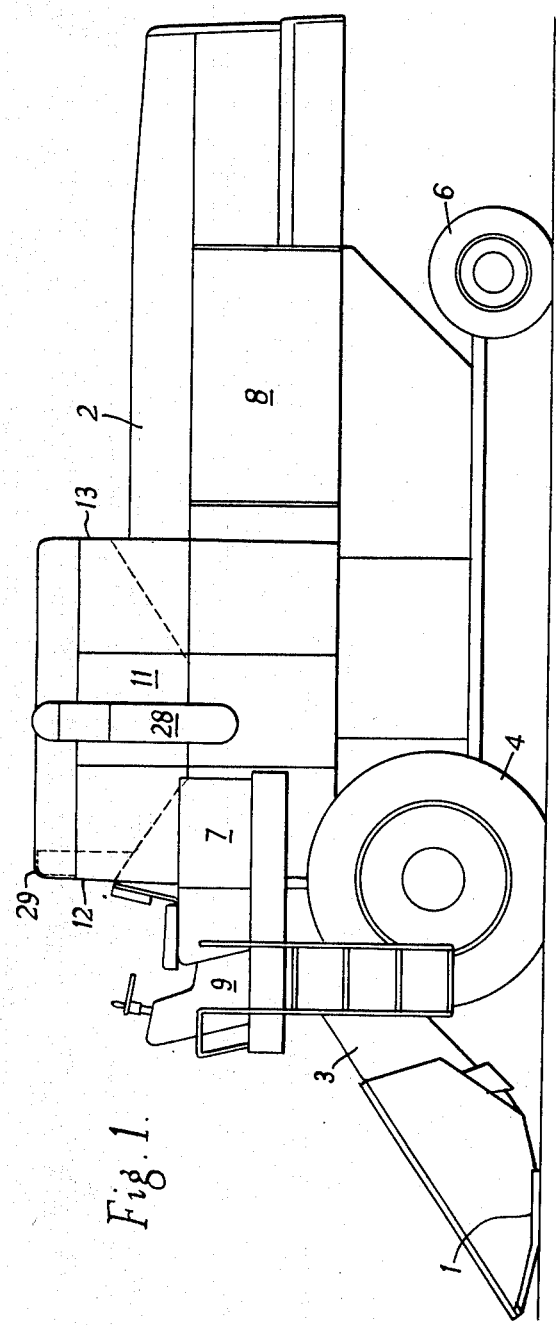
FIGURE 1 is a side elevation of a combine harvester according to the invention.

In the combine harvester illustrated in the drawings a grain cutting mechanism of known form is mounted on a feed table 1 which is disposed forwardly of a main body 2 of the harvester and is connected thereto by an upwardly and rearwardly inclined feed elevator 3. The main body is supported by a pair of large diameter driving wheels 4 at its front and by small diameter wheels 6 at its rear. It includes a threshing mechanism, whose location is indicated by the reference numeral 7 in FIGURE 1 of the drawings, a grain separating mechanism, whose location is indicated by reference numeral 8 and an engine for driving the moving parts of the harvester, all of which are of known form.

On one side of the main body of the harvester is an operator's platform 9 and behind this platform, and extending rearwardly of the driving wheels, is an enclosing means 11 formed of substantially upright front and rear walls 12 and 13, respectively, and side walls 14 and 16, respectively. Each of these walls is substantially rectangular, as indicated by FIGURE 1, and the enclosing means itself is also substantially rectangular when viewed in plan, as shown in FIGURE 2.

Within the enclosing means is a grain storage tank 17, an upper part of a grain elevator 18 for feeding grain from the cleaning mechanism 8 to the tank, and a radiator 19 and fan 21 which form part of the engine cooling system.

The grain tank extends transversely of the harvester and includes inlet and outlet end walls, two side walls and a base.

Both end walls are substantially vertical and extend from front to rear of the enclosing means 11, an inlet end wall 22 being spaced inwardly of side wall 16 of the enclosing means whilst the outlet end wall forms part of the side wall 14.

One side wall of the tank extends transversely of the harvester and forms part of the rear wall 13 of the enclosing means. The other side wall is formed of two parts, 24 and 26, respectively, of which part 24 extends parallel with front wall 12 of the enclosing means, from the outlet end wall of the tank towards inlet end wall 22, and part 26 is normal to a diagonal of the tank and extends from part 24 to the inlet end wall 22.

The base of the tank includes a central part 30 and two outer parts 23 which extend between the inlet and outlet ends of the tank. Each outer part 24 slopes upwardly and outwardly from central part 30 to an adjacent side wall of the tank whilst the central part 30 is of triangular section. Outlet augers for moving grain to an outlet spout 28 are respectively provided in troughs formed between outer parts 23 and central part 30 of the base.

An inlet auger 27 extends from the top of the grain elevator 18, through an aperture in the inlet end wall 22 and across an upper part of the tank 17 for the supply of grain thereto.

One outer part 23 of the base of the tank is continued upwardly and forwardly beyond the parts 24 and 26 of the side wall of the tank to meet the front wall 12 of the enclosing means 11, as shown in FIGURE 3 of the drawings, and a wall 31 which forms a continuation of inlet end wall 22, as indicated in FIGURE 4. As indicated in FIGURES 1, 2 and 3 the portion of the front wall 2 above the junction with the upwardly and forwardly sloping wall is partly formed by a vertically disposed portion of a perforated plate 29 of angle section, a horizontal portion of which extends rearwardly to meet the top of the part 24 of the side wall of the tank. A transversely extending passage is therefore defined between an upper part of front wall 12, perforated plate 29, the part 24 of the side wall of the tank, and the continuation of the outer part 23 of the base.

At the side of the harvester remote from the operator's platform 9 this passage widens in section by virtue of the termination of the part 24 of the side wall of the tank, the inner side of the passage then being defined by the wall 26 and its top by a perforated top plate 25. The passage then continues through a circular aperture formed in wall 31 to an outlet formed by apertures in an upper, front portion of the side wall 16 of the enclosing means.

The radiator 19 is mounted close to the outlet of the passage and the fan 21 is mounted in a housing 32 which connects the edge of the circular aperture with the radiator.

Connecting pipes extend downwardly from the radiator, in the space between the side wall 16 of the enclosing means and the inlet end wall 22, to the engine of the harvester and the fan 21 is driven by a belt drive which also extends through this space.

In operation of the harvester drive for the moving parts of the harvester is supplied by the engine and as the machine advances across a field crop is cut by the cutting mechanism and threshed by the threshing mechanism 7, and grain is fed upwardly by the grain elevator 18 to the grain storage tank 17. Cooling liquid for the engine flows through the connecting pipes between the engine and the radiator 19 in the enclosing means 11.

The fan 21 is driven by the belt drive from the output shaft of the engine and draws air through the perforated plate 29 of the enclosing means, along the passage, past the radiator, and out through the apertures in the side wall.

As the perforated plate of the enclosing means is at the top of the harvester, and therefore as far as possible both from the rear end of the machine from which issues chaff, dust and straw, and also from the cutting mechanism from which dust arises, the air at this point is less laden with dust and chaff which would otherwise tend to accumulate on these perforated parts and impede the flow of air to the radiator. Moreover, the perforated parts are disposed immediately behind the operator's platform 9 of the harvester. By removing dust and dirt from the vicinity of the operator this flow of air adds to the comfort of operating the machine.

I claim:

1. A combine harvester having a cutting mechanism, a threshing mechanism for threshing crop cut by the cutting mechanism, and a grain storage tank for storing threshed grain, wherein the grain tank is disposed within an enclosing means which is disposed rearwardly of an operator's platform at an upper part of the harvester, there being defined between the grain tank and the enclosing means a passage having an inlet in a front wall of the enclosing means, and an outlet, in which passage is disposed an engine cooling system having a radiator and a fan, the fan serving, during operation, to cause flow of air substantially free from straw particles past the operator's platform and through the passage from inlet to outlet thereof and across the radiator.

2. A combine harvester as claimed in claim 1, wherein the inlet of the passage is disposed to one side of the operator's platform.

3. A combine harvester as claimed in claim 2, wherein the passage extends transversely of the harvester and the passage inlet comprises a series of apertures extending across the front wall of the enclosing means whilst the passage outlet comprises apertures formed in a forward part of a side wall of the enclosing means, the radiator being disposed close to the outlet apertures, whilst the fan is arranged with its axis extending transversely of the harvester so that, in operation, air is drawn laterally into and along the passage to the radiator.

4. A combine harvester as claimed in claim 3, wherein the grain storage tank has two upright side walls, part of one side wall extending parallel with the front wall of the enclosing means, and a base having two transversely extending parts which extend upwardly and outwardly to respective side walls, part of the passage being defined by the front wall of the enclosing means, a side wall of the tank, an upwardly and outwardly extending continuation of one of the said parts of the base, and a top wall.

5. A combine harvester as claimed in claim 4, wherein an inlet end wall of the grain storage tank extends longitudinally of the harvester and is spaced from the adjacent side wall of the enclosing means, and the radiator and fan are disposed in the space between the said adjacent side wall and the tank.

6. A combine harvester as claimed in claim 5, wherein the radiator and fan extend at a location beyond the said part of one side wall of the tank, the said part terminates short of the inlet end wall of the tank, and a front corner of the tank is formed by a further part of the said side wall which extends substantially normal to a diagonal of the tank from the said part of the side wall to the inlet end wall of the tank, the said inlet end wall being continued forwardly to the front wall of the enclosing means and being formed with an aperture through which the passage extends.

7. A combine harvester as claimed in claim 1, wherein the enclosing means are substantially rectangular when viewed in plan.

8. A combine harvester as claimed in claim 7, wherein an inlet elevator for the supply of grain to the tank is disposed between the inlet end wall of the tank and the adjacent side wall of the enclosing means.

References Cited by the Examiner

UNITED STATES PATENTS

| | | | |
|---|---|---|---|
| 1,856,773 | 5/1932 | Masurg | 180—54 |
| 2,634,713 | 4/1953 | Bartch et al. | 123—41.48 X |
| 2,896,594 | 7/1959 | Ashton | 123—41.48 X |
| 2,920,829 | 1/1960 | Shane | 98—2.4 X |
| 2,999,347 | 9/1961 | Horne et al. | 56—473.5 X |
| 3,006,125 | 10/1961 | Claas | 56—20 |
| 3,126,810 | 3/1964 | Karlsson | 98—36 |

ABRAHAM G. STONE, *Primary Examiner.*

J. O. BOLT, *Assistant Examiner.*